United States Patent Office 3,365,429
Patented Jan. 23, 1968

3,365,429
PROCESS FOR MAKING EPISULFIDE POLYMERS
Riad H. Gobran, Levittown, and Stephen W. Osborn, Yardley, Pa., assignors to Thiokol Chemical Corporation, Bristol, Pa., a corporation of Delaware
No Drawing. Continuation-in-part of application Ser. No. 162,555, Dec. 27, 1961. This application Apr. 3, 1964, Ser. No. 357,300
28 Claims. (Cl. 260—79)

ABSTRACT OF THE DISCLOSURE

The polymerization of vicinal episulfide monomers using a catalyst which is the reaction product of (a) a Group II–B metal alkyl or aryl and (b) a co-catalyst selected from oxygen, sulfur, carbon disulfide, carbonyl sulfide, water, hydrogen sulfide, primary and secondary amines, alkanols, ketones, mercaptans, lower fatty acids and aldehydes.

---

This application is a continuation-in-part of our prior pending applications Ser. No. 162,555, filed Dec. 27, 1961, now abandoned; Ser. No. 165,034, filed Jan. 8, 1962; Ser. No. 168,836, filed Jan. 25, 1962, now abandoned; and Ser. No. 267,799, filed Mar. 25, 1963, now abandoned.

This invention relates to the production of episulfide polymers, and more particularly to a novel and improved method of making such polymers. The episulfide polymers made by the process of the invention may be either homopolymers or copolymers, depending upon whether one or more than one monomeric episulfide is used as a starting material. The term copolymers is used herein in its broad sense to include polymers formed from more than two monomers, e.g., terpolymers, as well as polymers formed from only two monomers. The term episulfide as used herein refers to vicinal episulfides, i.e., episulfides in which the sulfur atom is connected to adjacent carbon atoms. Portions of the subject matter disclosed in copending applications Ser. No. 174,700 filed Feb. 21, 1962, and Ser. No. 580,863 filed Sept. 21, 1966, now both abandoned, are claimed in the present case.

It is an object of the present invention to provide a process for making episulfide polymers of relatively high molecular weights. It is another object of the invention to provide a process for making episulfide polymers, which process, by relatively minor modifications, yields polymers with differing properties, e.g., thermoplastic or elastomeric polymers, as desired. It is another object of the invention to provide a process capable of producing good yields of episulfide polymers. It is still another object of the invention to provide a process capable of producing episulfide polymers having high melting points and exceptionally good solvent resistance. Other objects of the invention will be in part obvious and in part pointed out hereafter.

The present invention is based on the discovery that monomeric episulfides can be advantageously polymerized by utilizing as a polymerization catalyst a composite material which is the reaction product of two components. One of these components is an organometallic compound of the formula $R_2M$ wherein R is alkyl or aryl and M is a metal of Group II–B of the periodic system, i.e., zinc, cadmium or mercury.

The second component, which is reacted with the organometallic component to form the catalyst, can be generally characterized as a substance having at least one pair of unshared electrons. However, all substances falling within this broad genus do not appear to be operative. One relatively large sub-genus that has been found to be operative comprises compounds having an active hydrogen atom, including, for evample, water; hydrogen sulfide; primary and secondary alkylamines, e.g., methyl, ethyl and diethyl amines; alkanols, e.g., mercaptoethanol; acetone; lower fatty acids, e.g., acetic acid; and aldehydes, e.g., butyraldehyde. In addition to this sub-genus, i.e., the compounds having an active hydrogen, it has been found that useful catalysts can be prepared employing as the second component or co-catalyst elemental oxygen or sulfur, carbonyl sulfide and carbon disulfide. The preferred catalyst for the present process is the reaction product of diethylzinc and water.

The present process is generally applicable to the polymerization of episulfide monomers. Typical monomeric episulfides polymerizable by this process include ethylene, propylene, isobutylene, 1,2-butylene, 2,3-butylene, styrene and cyclohexene, sulfides; vinyl cyclohexane, vinyl cyclohexene, para-methyl styrene and butadiene episulfides; 2-benzyl thiirane; 1,2-epoxy-3, 4-epithiobutane, para-methyl styrene episulfide and allylthioglycidyl ether. As indicated above, different monomers and combinations of monomers yield products having substantially different properties. For example, the present process can be used to produce homopolymers of ethylene sulfide which are crystalline products having melting points as high as 215° C. or higher. Such products have exceptional solvent-resistance and are useful as high-temperature thermoplastic molding materials. The process can also be used to produce homopolymers of propylene sulfide and the butylene sulfides which are elastomers. High molecular weight copolymers of ethylene and propylene sulfide have been found especially useful as molding materials or as elastomers, depending upon the ratio of the two monomers used.

It is also possible to produce curable polymers by the present process. Such curable polymers are conveniently made by using a co-monomer having a second functional group in addition to the episulfide group. Thus if allylthioglycidyl ether is used as a co-monomer, the reslting polymer contains olefinic unsaturation through which it can be cured, e.g., by conventional vulcanization. If an epoxy-episulfide is used as a co-monomer, the resulting polymer contains re-active epoxy groups through which it can be cross-linked or cured. In preparing such curable copolymers, the difunctional monomer is desirably used to the extent of say 2 to 30 mol percent of the monomer mixture.

The composite catalysts used in the present process can be conveniently prepared by reacting the two components described above in a suitable inert liquid reaction medium, e.g., benzene, hexane, tetrahydrofuran, petroleum ether or mineral oil. The molar ratio of organometallic component to co-catalyst is preferably in the range 0.33:1 to 3:1, with the optimum ratio usually being about 1:1. The reaction temperature does not appear to be particularly critical and may vary from say −20° C. to 100° C., with the preferred range being 20° to 50° C. It is evident that in some cases the boiling point of the liquid reaction medium will determine the upper temperature limit.

To insure optimum catalyst activity and the attainment of the highest molecular weights, the catalyst should be freshly prepared and used as soon as possible after its preparation. In some cases it will be found desirable to prepare the catalyst in the polymerization reaction vessel just prior to or coincident with the initiation of the polymerization reaction. If it is necessary to store the catalyst for an appreciable period of time before it is used, say 48 hours or more, the activity of the catalyst can best be maintained by storage at a reduced temperature.

Since both oxygen and water are active co-catalysts, any free oxygen or water present in the atmosphere or in any of the materials used in capable of modifying the properties of the catalyst. Hence in order to avoid undesired alteration of the catalyst properties, both the preparation of the catalyst and the polymerization reaction should be carried out in an environment substantially free from elemental oxygen and water, except insofar as these substances may be present as catalyst components. Catalyst preparation and polymerization are desirably carried out in an atmosphere of inert gas such as nitrogen, helium or argon. It has been found that, in general, commercially available grades of the catalyst components can be used. The liquid reaction medium used should desirably be either dried over sodium or freshly distilled.

Details of the polymerization process are given in the specific examples set forth below. In general the polymerization process is executed by bringing the monomeric episulfide or mixture of episulfides into contact with the catalyst prepared in the general manner described above. It is preferable, in order to obtain optimum results, that the starting monomeric materials be freshly distilled just prior to use from a reducing agent, e.g., calcium hydride, to remove oxidation products and water therefrom. The amount of catalyst used ordinarily falls within the range .05 to 3% by weight of the monomer mixture, the preferred amount of catalyst being about 0.5% by weight. The polymerization reaction can be carried out over a rather wide range of temperatures, say −20° C. to 150° C. Typical reaction temperatures are given in the specific examples. The reaction time may vary from a few minutes to 48 hours or more depending upon the reaction conditions and the nature of the monomeric material.

The polymerization reaction may be conducted in any of various ways, such as in bulk without solvent, or in a solvent or emulsion, or even in the vapor phase. Solvent polymerization is preferred in most cases, and any of various inert solvents may be used, such as aromatic hydrocarbons, e.g., benzene, toluene or xylene; aliphatic hydrocarbons, e.g., isopentane, n-hexane or octane; chlorinated hydrocarbons, e.g., carbon tetrachloride, methylene chloride or ethylene chloride; ethers, eg., diethyl ether or dioxane; or tetrahydrofuran.

The reaction mixture may be agitated to facilitate the reaction. The pressure at which the reaction is carried out does not appear to be particularly critical. Thus the reaction can be conducted in an open vessel at atmospheric pressure or in a closed vessel under autogenous or other pressure. In either case the reaction environment should be kept oxygen-free and water-free by the use of an atmosphere of purified inert gas for the reasons pointed out above.

In order to point out more fully the nature of the present invention, the following specific examples are given of illustrative methods of making the present products and some of the properties of the products thus produced. In the examples the intrinsic viscosity determinations were made according to standard procedures using a Cannon-Ubbelohde dilution viscometer. The melting points were determined microscopically using a Kofler hot stage at a heating rate of 3° C. per minute. Melt index values were obtained with a capillary flow plastometer of the type sold by F. F. Slocum Corporation of Wilmington, Del. The test procedure used conformed generally to ASTM Method D-128-57T. In determining the melt indices, the plugged reservoir of the test instrument was preheated to and maintained at 215° C. ±2° and then charged with 4 to 6 grams of polymer within a two-minute interval. A 5 kg. weight was then placed atop the charge by means of a ram and left there for 2.00 minutes. The 5 kg. weight was then replaced with a 2160 gram weight. After an additional 0.25 minute, the plug was removed from the flow orifice of the reservoir, and the flow of polymer through the orifice was measured. The amounts of polymer which flowed through the orifice during each one-minute interval was separately collected and weighed to the nearest milligram. Unless otherwise indicated, the melt index values given in the examples are averages of the one-minute samples collected over the first five minutes of the test. Thus if a total of 3.5 grams of polyethylene sulfide flowed through the orifice during the first five minutes of the test, the melt index as defined herein would be 0.7 gram per minute. In some of the experiments described in the examples, the product polymer contained physically bound solvent which was removed by evaporation, first at room temperature and then in a vacuum oven at elevated temperature.

Example 1

A thirty-ounce polymerization bottle was successively charged with 100 ml. of benzene and 0.15 ml. of water. The bottle was then flushed with nitrogen and charged with 2 ml. of a 0.00578 mol/ml. solution of zinc diethyl in benzene. The solution was allowed to stand at room temperature until it started to yellow, which took about two hours.

A nitrogen-filled 30-ounce polymerization bottle was successively charged with 50 ml. of freshly distilled ethylene sulfide and 10 ml. of the catalyst solution as prepared above. The contents of the bottle were thoroughly shaken after which the bottle was flushed with nitrogen, capped, and allowed to stand overnight at room temperature. Polyethylene sulfide was formed which was separated and heated at 35° C. to remove solvent in a vacuum oven under 1 mm. mercury vacuum for about four hours. A fluffy material was obtained comprising 13 grams (20% of theory). The polymer product had a melting point of 208–212° C. The molten product when cooled in a thin layer formed a thin flexible film.

Example 2

A solution of diethyl zinc-water catalyst was prepared prior to use in the polymerization described below with 252.2 millimoles/227 millimoles of diethyl zinc/$H_2O$ mixed under a blanket of nitrogen gas in 2270 ml. of dried benzene.

A 130-gal. reactor was sequentially charged with 170 lbs. (23.2 gal.) of dried benzene, 0.832 mols (50 lbs., 5.8 gal.) of dried ethylene sulfide monomer, and the total amount of catalyst solution that was previously prepared the same day, as described above, all under a blanket of nitrogen gas with agitation. The reactor was sealed, and the temperature of the reactant mixture was raised to about 176° F. and held thereat for 2 hours. The contents were then cooled, the reactor unsealed, and the wet polymer product dried first by centrifuging to spin off the liquid portions, then through vacuum drying at elevated temperatures not exceeding 118° F. The dried powdery white crystalline polymer product obtained had a melting point range of 208°–214° C. and a melt index average flow value for the first five minutes of flow at 215° C. of 0.12 g./min.

To demonstrate the insolubility of the homopolymers of the present invention, 2.5 grams of the polymer prepared above was added to 50 grams of o-dichlorobenzene. The solvent had a refractive index of 1.5492 at 25° C. before the test, based on three readings of 1.5492, 1.5491 and 1.5492. The mixture of polymer and solvent was periodically agitated and held at a temperature of 180° C. for four hours, and the undissolved polymer was then filtered from the solvent at 180° C. using a sintered glass filter. The solvent was then cooled to room temperature, and it had a refractive index at 25° C. of 1.5490, based on four readings of 1.5489, 1.5490, 1.5490 and 1.5491. A control sample of solvent was also held at 180° C. for four hours, without polymer therein, and after being cooled to room temperature, it has a refractive index at 25° C. of 1.5492, based on three readings of 1.5491, 1.5492 and 1.5492.

Six samples of polymer made according to the procedure given above were injection molded into ½″ x ⅛″ x 3″ bars using conventional injection molding equipment (Unex Jet Plastic Molder, Hinchman Manufacturing Company, Inc., Roselle, New Jersey). The molding and annealing conditions are given in Table I below. Molding was effected at three different temperatures, and two different annealing procedures, A and B, were used. In procedure A the molded article was water-cooled at tap water temperatures, whereas in procedure B the molded article was maintained at 180° C. for seven minutes, followed by gradual atmospheric cooling to room temperature.

After anealing, the molded materials were tested for Izod impact strength, tensile strength, elongation, flexural strength and flexural modulus properties. The results are given in Table II below, wherein the standard ASTM tests used are identified. In Table II the numbers in parentheses indicate the number of tests run, the values given in the table being averages for the indicated number of tests.

TABLE I

| Cylinder temp., °F. | Nozzle temp., °F. | Mold temp., °F. | Annealing procedure |
|---|---|---|---|
| 378 | 450 | 171 | A |
| 378 | 450 | 257 | A |
| 415 | 485 | 302 | A |
| 378 | 450 | 171 | B |
| 415 | 485 | 257 | B |
| 415 | 485 | 302 | B |

TABLE II

| Izod Impact strength, ft. lb./in. ASTM D-256 | Tensile strength, p.s.i. ASTM D-638 | Elongation, percent ASTM D-638 | Flexural strength, p.s.i. ASTM D-790 | Flexural modulus, p.s.i. ASTM D-790 |
|---|---|---|---|---|
| 1.02 | 6,586 (5) | 3 (5) | 13,543 (5) | 315,440 (5) |
| 1.03 | 6,548 (3) | 4 (3) | 13,398 (5) | 369,860 (5) |
| 0.69 | 4,415 (5) | 3 (5) | 11,390 (5) | 400,880 (5) |
| 1.55 | 6,731 (5) | 3 (5) | 13,551 (5) | 345,825 (5) |
| 1.13 | 6,920 (3) | 4 (3) | 13,154 (4) | 382,575 (4) |
| 0.96 | 5,896 (5) | 2 (5) | 11,368 (5) | 388,360 (5) |

*Example 3*

A catalyst solution was prepared under nitrogen by dissolving 2 ml. of a benzene solution of diethyl zinc, containing 0.0111 mol of diethyl zinc, in 100 ml. of anhydrous benzene. To this solution was added 8.5 ml. of a solution of hydrogen sulfide in benzene containing 0.00555 mol of $H_2S$. The mixture was shaken frequently for about 30 minutes before use.

A steel bomb was washed, rinsed with water and then acetone, and dried with nitrogen. 100 ml. (100.4 grams) of crude ethylene sulfide was filtered into the bomb through a medium sintered glass funnel. 5 ml. of the freshly prepared catalyst solution was pipetted into the bomb under nitrogen. The bomb's cap was screwed on using O rings to provide a tight seal. The bomb was then placed in an 80° C. water bath for four hours. Thereafter the bom was removed, cooled to room temperature with tap water and opened. A slight pressure buildup in the bomb was noticed when the bomb was opened. The product was a white, very light weight, powdery polymer which came out of the bomb in almost one solid mass. The yield was 90.2 grams or 90%. Melting point of the polymer was 206° to 210° C.

*Example 4*

A bottle was flushed with nitrogen and successively charged with 150 ml. of benzene, 1.8 ml. (0.0081 mol) of a 53% solution of diethyl zinc in benzene, 0.14 ml. (0.0078 mol) of oxygen-free water and 50 ml. (0.64 mols) of propylene sulfide. The mixed reagents formed a clear solution. The bottle was capped and placed in a 60° C. tumbling bath for 3.5 hours. The bottle was then removed from the bath and cooled to room temperature. After evaporation of the solvent from the product, first in air and then in a vacuum oven at room temperature overnight, 41.9 g. of a clear, light amber colored solid material was obtained which was a nontacky elastomer. The elastomer was substantially insoluble in benzene and had an intrinsic viscosity of 3.2 in methylene chloride at 30° C.

*Example 5*

A clean 30-ounce bottle was flushed with nitrogen, and 300 ml. of benzene was distilled from sodium directly into the bottle. To the bottle was added 25 ml. of a saturated solution of $H_2S$ in benzene (0.016 mol of $H_2S$ in 25 ml. of benzene at 20° C.), and 300 ml. of twice-distilled propylene sulfide was fractionally distilled into the bottle from calcium hydride using a 300-mm. Widmer column. Then 0.016 mol of diethyl zinc in a standard solution in benzene was added by means of a calibrated syringe. The mixture, which became cloudy imediately, was again blanketed with nitrogen. The bottle was capped with aluminum foil and swirled to effect a complete mixing of the mixture. After an induction period of 5 to 10 minutes, the mixture became noticeably more viscous, and after 20 to 25 minutes the temperature reached 35°–40° C. as the polymerization proceeded exothermically.

After the temperature reached 40° C. the mixture gelled within 5 minutes, and the polymerization proceeded to completion at the boiling point of the solvent (75°–80° C.) as indicated by visible bubbling of the mixture and the presence of vapors at 75°–80° C. over the polymer mass. The heat of reaction required 15 to 30 minutes to evolve, and the mixture was allowed to cool and stand at room temperature for 24 hours. The bottle was cracked open to remove the polymer, and the benzene was evaporated in vacuum at 1 mm. Hg to yield 237.1 grams (72%) of rubbery product. The polymer produced was tack-free, relatively soft, milky white material. The intrinsic viscosity measured in chloroform at 30° C. was an average of 4.65, and the homopolymer had an average molecular weight as determined by light scattering measurement technique of 1,058,000.

The solubility of the polymer was determined as follows:

1 gram of polypropylene sulfide was added to 100 ml. of each of four different reagent grade solvents and shaken for 24 hours at room temperature with the following results:

Benzene—Insoluble, extensive swelling of polymer
Methylene chloride—Less than 1% soluble, clear solution, extensive swelling of polymer
Hexane—Insoluble
Chloroform—Less than 1% soluble, clear solution, extensive swelling of polymer.

*Example 6*

A clean 30-ounce bottle was flushed with nitrogen and successively charged with 100 ml. of methylene chloride which had been dried over calcium sulfate, 0.15 ml. (0.0083 mol) of oxygen-free water and 2 ml. of a 0.00578 mol/ml. solution of diethyl zinc in benzene. The solution was allowed to stand at room temperature under nitrogen until a yellow color developed. 50 ml. (47.3 g.) of propylene sulfide were then added to the solution, and the reaction system was allowed to stand at room temperature under a nitrogen atmosphere until it began to thicken, which took about 3 hours. 50 ml. (50.3 g.) of ethylene sulfide were then added to the reaction system, and the bottle was capped with aluminum foil and it and its contents, under nitrogen, were allowed to stand overnight at room temperature. A solid milky white reaction mass resulted which contained some unreacted monomeric materials and the solvent physically entrapped therein. The mass was dried overnight in an oven at 52° C./1 mm. Hg to remove the solvent and monomeric materials. 88.7 g. (91% of yield) of a white solid powdery elastomeric copolymer were thereby obtained which started to melt at 156° C. and was a clear liquid at 182° C. Upon cooling, the melted materials formed a very flexible film. Using a melt viscosity device, the copolymer was extruded at 184° C. into a very flexible, wire-shaped object.

Example 7

A hydrogen sulfide-zinc diethyl catalyst was prepared by reacting 0.016 mol of $H_2S$ dissolved in 25 ml. of benzene at 20° C. with 0.016 mol of zinc diethyl in a standard benzene solution.

A clean 30-ounce bottle was flushed with nitrogen, and 300 ml. of benzene was distilled from sodium directly into the bottle. The preformed $H_2S$-zinc diethyl catalyst was then added to yield a mixture that was cloudy and was blanketed with nitrogen.

Thereafter 300 ml. of twice distilled propylene sulfide was fractionally distilled into the bottle from calcium hydride using a 300 mm. Widmer column, and 17.5 ml. (3.5 mol percent) of freshly distilled allylthioglycidyl ether (B.P. 85°–86° C./25 mm.) was added to the bottle by means of a pipette. The bottle was capped with aluminum foil and swirled to effect a complete mixing of the mixture. The reaction was conducted at room temperature (25°–30° C.) for about 12 hours. The polymers produced were tack free, soft, milky white materials.

A solubility test was conducted by attempting to dissolve 1 gram of the polymer in approximately 100 ml. benzene by shaking the solvent and the polymer together at room temperature (25°–30° C.) for about 48 hours. The polymer was in the solvent for a total of 72 hours and was soluble at this 1% concentration. The intrinsic viscosity measured in chloroform at 30° C. was 3.36.

Example 8

To each of three, clean, 30-ounce soda bottles which had been dried at 100° C. there was successively charged 19.5 grams of allylthioglycidyl ether, 75 grams of 1,2-butylene sulfide, about 400 ml. of (dried over lead-sodium alloy) benzene and 10 ml. of a catalyst solution containing 1.2 millimoles of zinc diethyl and 0.9 millimole of distilled water. The head of each of the charged bottles was sparged with nitrogen and the bottles were then capped. The capped bottles were then tumbled for five hours in an 80° C. water bath. The bottles were then removed from the bath, uncapped, and the contents of each bottle were emptied separately, while still hot, into about 3000 ml. of methanol. Each batch of polymer was allowed to stand in the methanol over the weekend at room temperature. The polymer batches were then removed from the methanol and cut up into small pieces, washed with methanol and allowed to stand in methanol overnight at room temperature. The three batches of polymer were washed once more with methanol and then dried under vacuum at about 55° C. The yields for each of the three runs were 48.4, 48.4, and 50.3%, respectively.

A blend of the three batches of copolymer produced above was prepared from 40 grams of each of runs #1 and #2 and 42 grams of run #3. Most of this blend was then cured with the following cure recipe:

| | Grams |
|---|---|
| Copolymer | 120 |
| Stearic acid | 1.2 |
| Philblack O (carbon black) | 60 |
| Zinc oxide | 6 |
| Sulfur | 1.8 |
| Selenium diethyl-dithiocarbamate | 2.4 |

The recipe was cured for 20 minutes at 300° F., and the cured product had the following properties:

| Modulus: | |
|---|---|
| 100 | 340 |
| 200 | 750 |
| 300 | 1025 |
| Tear | 93 |
| Tensile, p.s.i. | 1025 |
| Elongation, percent | 300 |
| Hardness, Shore A | 69 |

Example 9

A solution containing 2.705 millimoles of dibutylzinc per ml. of benzene was prepared (1.11 millimoles/0.41 ml.). To 100 ml. of distilled tetrahydrofuran, 0.20 ml. of water (11.1 millimoles) and 4.10 ml. of dibutyl zinc solution (11.1 millimoles) were added; this mixture turned yellow after two minutes. A glass reactor was charged with 100 grams of ethylene sulfide monomer, 400 ml. of lactol spirits and 10 ml. of the tetrahydrofuran-dibutylzinc/$H_2O$ catalyst solution prepared as above (containing approximately 1.11 millimoles of dibutylzinc/$H_2O$, 1:1 catalyst). The reactor was purged with dry nitrogen gas and sealed. The temperature of the reactor was raised to 80° C. and maintained there for two hours, with agitation of the reaction mixture. The reactor was then opened and recovery of poly(ethylene sulfide) polymer in 96% yield was made. The dried product had a melting range of 201 to 215° C. A duplicate run produced polymer in 93.4% yield with a melting range of 199 to 214° C.

A run was made wherein the glass reactor was charged with 100 grams of ethylene sulfide monomer, 400 ml. of lactol spirits, 0.02 ml. of water and 0.41 ml. of the dibutylzinc benzene solution as first prepared above. The "in situ" formation of 1:1 dibutylzinc/$H_2O$ catalyst occurred; almost immediately solid particles of polymer formed. The reactor was purged with nitrogen, sealed and elevated to and maintained at 80° C. for two hours, with agitation of the reaction mixture. At the end of this interval the reactor was opened and 98.1% yield of polymer obtained with a melting range of 197–212° C. A duplicate run produced 98.2% yield of polymer with a melting range of 196–216° C.

Example 10

A suspension of 12 grams of diphenylmercury and 9 grams of zinc metal shavings in 70 ml. of xylene were heated to and maintained at reflux temperatures for 48 hours. Some elemental mercury formed. The reaction mixture was filtered under carbon dioxide gas, and the filtrate obtained was cooled to 15° C. Crystals of diphenylzinc precipitated and were recovered. The liquid portions were also retained.

A reactor was charged with 400 ml. of benzene, 0.3 gram of crystalline diphenylzinc (about 1.37 millimoles) prepared as above, 100 grams of ethylene sulfide monomer, 400 ml. of lactol spirits and 0.02 ml. (about 1.11 millimoles) of water. The reactor was flushed with dry nitrogen gas and sealed. Almost immediately some solid polymer was formed and precipitated. The reaction mixture was elevated to and maintained at 80° C. for two hours with agitation. At the end of this interval the mixture was cooled, the reatcor opened and 58% yield of dried polymer was recovered. The product had a melting point range of 204–206° C.

Another run was made with 10 ml. of the liquid portions saved from the preparation of crystalline diphenylzinc, as above, wherein it was substituted for 0.3 gram of crystals used in the foregoing polymerization procedure. The liquid portions upon analysis were shown to contain 0.25 millimole of diphenylzinc per ml. A white solid polymer was recovered from the reactor in 100% yield which had a melting range of 207 to 213° C.

Example 11

A glass reactor was charged with 100 grams of ethylene sulfide monomer, 400 ml. of benzene, 0.384 gram (1.11 millimoles) of diphenylmercury and 0.02 gram (1.11 millimoles) of water. The reactor was flushed with dry nitrogen gas and sealed. The reaction mixture was elevated to and maintained at 80° C. for 18 hours. A solid homopolymer was recovered which had a melting range of 203 to 208° C.

Example 12

A dried glass reactor was purged with dry nitrogen gas and sealed with a rubber serum cap. The reactor was then charged with 1.11 millimoles of diethylzinc in benzene solution and 60 cc. of dry air at atmospheric pressure and about 75° F., ambient temperature, by means of a hypodermic syringe. The reactor contents were mixed at ambient temperature for about 15 minutes. The serum cap was then removed and 300 ml. of dry benzene and about 100 grams of ethylene sulfide monomer were charged to the reactor under an atmosphere of dry nitrogen gas. A white precipitate formed upon the addition of monomers. The reactor was sealed, and the contents raised to and maintained at 80° C. for two hours with agitation. The reactor was then opened and the homopolymer separated and dried in 78% yield. It had a melting point range of 207 to 209.5° C.

In another run the foregoing procedure was essentially repeated, using, however, an undried reactor initially filled with atmospheric air. A homopolymer was obtained in 87% yield which had a melting range of 208 to 212° C.

Example 13

A glass reactor was charged with 100 ml. of dried benzene, 2.37 ml. of diethylzinc in benzene solution (11.11 millimoles) and 0.78 ml. (11.11 millimoles) of mercaptoethanol. There was an immediate precipitation of solids. After ten minutes the most of the larger particles settled leaving a turbid liquid layer. A 10-ml. portion of the turbid layer was charged to each of four dried glass reactors that had each previously been purged with dry nitrogen gas and charged with 600 ml. of dried benzene and 100 grams of ethylene sulfide monomer. The reactors were sealed and raised to and maintained at 80° C. for two hours. The reactors were then opened, and the homopolymers obtained were dried. They were obtained in 60%, 68%, 47.7% and 45% yields with respective melting ranges of 205 to 209.5° C., 205 to 209.5° C., 204.5 to 209° C. and 205 to 210° C.

Example 14

A 1:1 diethylzinc/acetone catalyst solution, 0.111 millimole ml., was prepared by mixing 2.31 ml. of diethylzinc (11.1 millimoles) with 1.17 ml. of acetone (11.1 millimoles) in 100 ml. of dried benzene. A dried glass reactor was charged with 100 grams of ethylene sulfide monomer, 300 ml. of dried benzene and 10 ml. of catalyst solution under a dry nitrogen gas atmosphere. The reactor was sealed and elevated to and maintained at 80° C. for two hours. At the end of this interval, the reaction mixture was cooled and the reactor was opened. A homopolymer was recovered in 57% yield with a melting range of 205.5 to 209° C.

Example 15

A catalyst solution of 0.111 millimole of 1:1 diethylzinc/ethanolamine per ml. was prepared by mixing together 100 ml. of dried benzene, 11.11 millimoles of diethylzinc and 11.11 millimoles of ethanolamine under an atmosphere of dry nitrogen gas. The solution was aged one hour prior to use. A glass reactor was charged with 100 grams of ethylene sulfide monomer, 400 ml. of dried benzene and 10 ml. of the catalyst solution, prepared as above, all under an atmosphere of dry nitrogen gas. The reactor was sealed and raised to 80° C. for two hours. The reaction mixture was then cooled and 15% yield of homopolymer was recovered therefrom.

Another run was made according to the foregoing procedure, except that (a) diethanolamine was used in place of ethanolamine, and that (b) in situ formation of catalyst/cocatalyst was produced in the reactor by charging directly thereto the 1.11 millimoles of diethylzinc and diethanolamine. The homopolymer was recovered in 13.5% yield with a melting point range of 202 to 205° C.

Still another run was made as above, but octadecylamine was used instead of diethanolamine. Homopolymer, in this instance, was recovered in 75.8% yield; it showed a melting range of 208 to 210° C., and when used in a melt index plastometer, showed a flow of only 0.34 grams per minute during the eighth minute at 215° C.

Example 16

In similar manner to Example 15, 1.11 millimoles of diethylzinc and water and 1% by weight of octadecyl amine were charged to a glass reactor. The homopolymerization of ethylene sulfide proceeded as was previously described to produce 77% yield of poly(ethylene sulfide) which showed a melting range of 203 to 205° C. and a melt index flow of only 0.23 grams/min. during the eighth minute at 215° C.

Example 17

A catalyst solution of 0.11 millimoles/ml. of 1:1 diethylzinc/carbon disulfide in benzene was prepared by mixing 11.1 millimoles of diethylzinc and 11.1 millimoles of carbon disulfide in 100 ml. of dried benzene under a nitrogen gas atmosphere. The solution was aged for one hour prior to use. A glass reactor was charged with 100 grams of ethylene sulfide monomer, 400 ml. of dried benzene and 10 ml. of the catalyst solution as prepared above. In similar manner to the other experiments, homopolymer was obtained in 99% yield, which showed a melting range of 208 to 209° C. and a melt index flow of only 1.3 grams/minute during the eighth minute at 215° C.

Example 18

A benzene solution was prepared with 0.1188 millimoles of diethylzinc and 0.0893 millimole of water per ml. of solution, thus to provide a 1:0.75 mole ratio catalyst/cocatalyst of diethyl zinc/water. A glass reactor was charged with 70 grams (0.795 mole) of butylene sulfide monomer, 8 grams (0.072 mole) of cyclohexene sulfide monomer, 22 grams of allyl thioglycidyl ether monomer, 400 ml. of dried benzene and 10 ml. of the catalyst solution as prepared above, all under a blanket of dry nitrogen gas. The reactor was sealed, and the contents were heated to and maintained at 65° C. for 17 hours with agitation. The reactor was then opened after cooling, and the monosulfide interpolymer produced was dried and recovered in 81.4% yield. The interpolymer was rubbery in nature and was curable with sulfur. In another run, interpolymer was obtained in 83.8% yield.

Example 19

A diethylzinc/water catalyst solution in benzene was prepared by mixing together a 1:0.75 mole ratio of catalyst/cocatalyst in benzene to provide a concentration of a 0.1188 millimole diethylzinc to 0.0893 millimole of water per ml. of final solution. A dried glass reactor was charged with 5.0 grams of cyclohexene sulfide monomer, 20 ml. of dried benzene and 0.5 ml. of the catalyst solution prepared as above. The reactor was sealed, and the reaction mixture was permitted to stand without agitation at room temperature for approximately seven days. A white powdery homopolymer was recovered therefrom at the end of this interval, washed and dried. It was a plastic material with a softening point at about 120° C.

Example 20

A benzene solution containing 4.74 millimoles of diethylzinc per ml. was prepared. About 1.5 ml. of this solution was dissolved in dried tetrahydrofuran. To this was added 0.082 grams of water to provide a catalyst solution with 0.2822 millimoles of diethylzinc/0.211 millimole of water per 4.7 ml. A dried glass reactor was charged with 11 grams of isobutylene monomer, 11 ml. of dried benzene and 4.7 ml. of catalyst solution. The reactor was sparged with dry nitrogen gas, sealed and maintained at 0 to 10° C. for about 21 days. The reactor was opened, and the poly(isobutylene sulfide) produced was separated from the liquid portions and dried. The yield obtained was 46.4%.

The solid white crystalline polymer had a melting point of 190 to 191° C., and while partially soluble in chloroform it proved insoluble in benzene, methyl ethyl ketone, dimethyl formamide and tetrahydrofuran at room temperature.

*Example 21*

A catalyst solution was prepared by mixing together 3.7 ml. of a benzene solution containing 11.1 millimoles of diethylzinc, 0.65 ml. or 11.1 millimoles of ethanol and 100 ml. of dried tetrahydrofuran; it was aged 15 minutes prior to use. A dried glass reactor was charged with 100 grams of ethylene sulfide monomer, 400 ml. of dried benzene and 10 ml. of the catalyst solution prepared as above. The reactor was sparged with dry nitrogen gas, sealed and elevated to 80° C. for two hours. The reactor was then cooled and opened; the white powdery crystalline homopolymer producct obtained was isolated and dried. Yield was 93.2% for the product, which showed a melting range of 200° to 212° C.

*Example 22*

In similar manner to Example 21, a catalyst solution of approximately 0.111 millimole of diethylzinc/isopropyl alcohol per ml. was prepared by substituting 11.1 millimoles or 0.84 ml. of isopropyl alcohol for the ethanol used therein. Polymerization of ethylene sulfide monomer was also carried on as described in Example 21, producing in two runs homopolymer in 88% and 83.5% yield and with respective melting ranges of 198° C. to 220° C. and 201° to 212° C.

*Example 23*

In similar manner to Example 21, a catalyst solution of approximately 0.111 millimole of diethylzinc/tert-butanol per ml. was prepared by use of 1.05 ml. or 11.11 millimoles of tert-butanol for the ethanol used therein. Polymerization of ethylene sulfide monomer was carried out as described in Example 21, producing in two runs homopolymer in 89.7% and 59.2% yield and with respective melting ranges of 198° to 211° and 199° to 218° C.

*Example 24*

In similar manner to Example 21, a catalyst solution of approximately 0.111 millimole of diethylzinc/acetic acid per ml. was prepared by use of 0.66 ml. or 11.11 millimoles of glacial acetic acid for the ethanol used therein. There was an immediate and vigorous evolution of gas bubbles. The solution obtained was colorless, and was aged for 30 minutes prior to use. Polymerization of ethylene sulfide monomer was carried out as described in Example 21, producing in two runs homopolymer in 97.5% and 96.4% yield, and with respective melting ranges of 197° to 230° C. and 199° to 217° C.

*Example 25*

In similar manner to Example 24, a colorless catalyst solution of approximately 0.111 millimole of diethylzinc/n-butyraldehyde per ml. was prepared by use of 0.98 ml. or 11.11 millimoles of n-butyraldehyde for the acetic acid used therein. Polymerization of ethylene sulfide monomer was carried out as described in Example 21, producing in two runs homopolymer in 88.3% and 94.2% yield, and with respective melting ranges of 198° to 211° C. and 197° to 212° C.

*Example 26*

Diethylcadmium was prepared by (a) reaction of 29 grams (1.2 mole) magnesium metal turnings and 131 grams (1.2 mole) ethyl bromide in ether at reflux temperatures and under a nitrogen atmosphere to prepare the ethyl magnesium bromide Grignard reagent, then (b) adding cadmium chloride thereto and after one hour of reaction, removal of the ether by distillation at 80 to 120° C. The yellow liquid product obtained was vacuum distilled under nitrogen to further remove ether values. The liquid pot product, diethylcadmium, was obtained in 6.6 gram yield.

A glass reactor, previously dried and flushed with dry nitrogen, was charged with 150 ml. of dried benzene, 47.3 grams of propylene sulfide monomer, 0.14 gram (0.0078 mole) of degassed water and 1 ml. (1.65 grams, 0.01 mole) of diethylcadmium, the later prepared as above. The area above the charged components was sparged with dry nitrogen gas, and the reactor was sealed. The temperature was raised to and maintained at 60° C. for three hours with tumbling of the reactor to provide agitation. The reactor was then cooled and opened to provide a brown mobile liquid. The reactor was again sealed and tumbled at 60° C. for another 16 to 20 hours. At the end of this period a brown, slightly elastomeric solid homopolymer product was isolated after drying in 43.4 grams or 92% yield of theoretical.

*Example 27*

A glass reactor, previously dried and flushed with dry nitrogen, was charged with 150 ml. of dried benzene, 47.3 grams of propylene sulfide monomer, 1 ml. (1.65 grams, 0.01 mole) of diethylcadmium, prepared as in Example 26, and a flow of dry hydrogen sulfide gas through the other charge components for a ten minute period. The reactor was then sealed and tumbled at 60° C. for three hours. The reaction mixture turned a bright yellow prior to tumbling and a precipitate formed. During tumbling the mixture got hot. At the end of three hours a viscous orange-yellow liquid was obtained. The reactor was then tumbled for another 16 to 20 hours to yield after drying 46.1 grams or 98% of theoretical of a bright yellow elastomeric homopolymer.

*Example 28*

A glass reactor, previously dried and flushed with dry nitrogen, was charged with 150 ml. of dried benzene, 47.3 grams of propylene sulfide monomer, 0.9 ml. (0.8 gram, 0.0089 mole) of n-butyl mercaptan and 1 ml. (1.65 grams, 0.01 mole) of diethylcadmium, the latter prepared as in Example 26. The area above the charged components was flushed with dry nitrogen gas. The reactor was sealed and tumbled at 60° C. for three hours to yield a clear orange-yellow liquid which solidified to a red elastomeric homopolymer after further tumbling for 16 to 20 hours at 60° C. and drying. The poly(propylene sulfide) was obtained in near quantitative yield (approximately 49.6 grams), and showed an intrinsic viscosity at 30° C. in methylene dichloride of 1.0.

*Example 29*

A catalyst solution was prepared by mixing distilled water and diethyl zinc in a 0.75:1 ratio with benzene that had been refluxed and distilled over sodium and stored over a synthetic zeolite. The solution was allowed to stand until a yellow color developed.

A reaction bomb, sparged with nitrogen and sealed, was charged with 16.3 grams (0.125 mole) of allylthioglycidyl ether, 74.0 grams (1.0 mole) of propylene sulfide, 7.5 grams (0.125 mole) of ethylene sulfide, 400 ml. of benzene and 10 ml. of catalyst solution prepared as described above. The added catalyst solution contained 1.2 millimoles of diethyl zinc and 0.9 millimoles of water.

The contents of the bomb were heated for four hours at 80° C., after which the bomb was cooled and opened. Upon pouring the contents into a 2000-ml. portion of methanol, the polymer precipitated. The particle size of the polymer product was reduced and washed twice with separate 1000-ml. portions of methanol. The sample yielded 90.5 grams, i.e., 92.5% of the amount theoretically possible.

A quantity of 150 grams of this polymer was vulcanized for 20 minutes at 300° F. with 1.5 grams of stearic acid, 75.0 grams of a high abrasion furnace black sold under the trade name Philblack O, 7.5 grams of zinc oxide, 3.0 grams of selenium diethyldithiocarbamate and 0.9 gram of sulfur. In obtaining the data given in the following tables, tensile, modulus and elongation were measured according to ASTM Test D-638-58T. Hardness is reported in terms of a Shore A durometer value as defined in ASTM Test D-676-59T. Compression set is reported in percent of original deflection as set forth in ASTM Test D-395-55, after maintaining the sample at 158° F. for 22 hours. The tear strength, reported in pounds, was obtained using Die C in ASTM Test D-624-54.

The physical properties of the polymer vulcanized as described above were as follows:

Modulus, lbs./sq. in.
100% _____ 390
200% _____ 840
300% _____ 1320
Tensile, lbs./sq. in. _____ 1550
Elongation, percent _____ 368
Tear strength, lbs. _____ 240
Hardness, Shore A _____ 72

Samples of the cured polymer were placed in a series of solvents and after one week at room temperature were swollen as follows:

Percent
Ethyl acetate _____ 87
Toluene _____ 207
Methyl ethyl ketone _____ 107
Chloroform _____ 227
Hexane _____ 10

Example 30

A 30-ounce polymerization bottle was cleaned, dried and charged with 71.5 grams of 1,2 butylene sulfide, 13.9 grams of ethylene sulfide, 15.1 grams of allylthioglycidyl ether, 400 ml. of benzene and 10 ml. of diethyl zinc solution as prepared in Example 29. The bottle was sparged with nitrogen, capped and placed in a 50° C. water bath for 60 hours, during which time a copolymer of 1,2 butylene sulfide, ethylene sulfide, and allylthioglycidyl ether formed. The bottle was cooled, opened, and the contents poured into 2000 ml. of methanol causing the polymer to precipitate. This precipitated polymer product was washed twice with separate 1000 ml. portions of methanol and dried in a vacuum oven at 50° C. to a constant weight. The yield obtained was 98.7 grams or 98.0% of the product yield theoretically possible.

A quantity of 100 grams of this copolymer was compounded on a rubber roll mill with 1.0 gram of stearic acid, 50.0 grams of a high abrasion furnace black sold under the trade name Philblack O, 0.6 gram of sulfur, 2.0 grams of selenium diethyldithiocarbamate, and 1.0 gram of octyl decylamine.

The physical properties of the above composition after being cured for 20 minutes at 300° F. were as follows:

Modulus, p.s.i.
100% _____ 135
200% _____ 305
300% _____ 500
Tensile, p.s.i. _____ 745
Elongation, percent _____ 490
Hardness, Shore A _____ 54
Tear Strength, lbs. _____ 120
Compression set, percent _____ 100
Compression set, tempered, percent _____ 87

Samples of the cured polymer were placed in a series of solvents. After one week at room temperature, the samples were swollen as follows:

Percent
Toluene _____ 334
Methyl ethyl ketone _____ 157
Chloroform _____ 572
Ethyl acetate _____ 121
Hexane _____ 17

Example 31

A 30-ounce reaction bottle was sparged with nitrogen and charged with 400 ml. of dry benzene, 70.0 grams of butylene sulfide, 22 grams of allylthioglycidyl ether, 8 grams of cyclohexene sulfide and 10 ml. of diethyl zinc solution prepared as described in Example 29. The bottle was again sparged with nitrogen, sealed, and heated at 65° C. for 17 hours, during which time a terpolymer of cyclohexene sulfide, butylene sulfide, and allylthioglycidyl ether formed. The bottle was then cooled, opened and the contents were poured into 200 ml. of methanol where the terpolymer precipitated. Next, the terpolymer was washed twice with separate 1000-ml. portions of methanol and once with 500 ml. of petroleum ether. The resulting material was dried at 50° C. under vacuum and yielded 83.8 grams of a semi-solid terpolymer.

A small quantity of this polymer was heated at 180° C. for four hours in the presence of 1.5% by weight of azobisisobutyronitrile, during which time it cured to a hard rubbery compound resistant to solution in chloroform.

Example 32

A 30-ounce polymerization bottle was charged with 40.7 grams of styrene sulfide, 40.6 grams of propylene sulfide, 19.5 grams of allylthioglycidyl ether, 400 ml. of benzene and 10 ml. of diethyl zinc catalyst solution as prepared in Example 29. The bottle was sparged with nitrogen, capped and placed in a rotating 50° C. bath for 42 hours, during which time a copolymer of propylene sulfide, styrene sulfide and allylthioglycidyl ether was formed. The contents of the bottle were then cooled and poured into methanol, causing the copolymer to precipitate. The copolymer particle size was mechanically reduced and the copolymer was washed again with separate portions of methanol. The copolymer yield was 68.1 grams, 67.5% of that theoretically possible.

A small quantity of the copolymer product was heated at 180° C. for four hours in the presence of 1.5% by weight of azobisisobutyronitrile, during which time it cured to a hard material resistant to solvent attack by chloroform.

It is of course to be understood that the foregoing examples are intended to be illustrative only and that numerous changes can be made in the ingredients, proportions and conditions specifically disclosed therein. For example, minor amounts of monomers other than the vicinal episulfides mentioned above can be used in the present process to produce copolymers containing monomeric units derived from said other monomers. Among the other monomers that can be so used are cyclic sulfides having the structure:

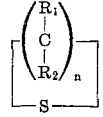

in which $n=3$ to 6, and $R_1$ and $R_2$ may be hydrogen, a lower branched or linear alkyl group having from 1 to 10 carbon atoms, an aryl, an arylalkyl and/or an alkylaryl group. $R_1$ and $R_2$ may also be heterocyclic, alicyclic, bicyclic or polycyclic. Examples of such cyclic sulfides are trimethylene sulfide, pentamethylene sulfide and hexamethylene sulfide.

In cases where the vicinal episulfide contains ethylenic unsaturation, minor amounts of various ethylenically unsaturated monomers may be employed in the present process. Such unsaturated monomers include olefins, such as ethylene, propylene, butylene and isobutylene; conjugated and non-conjugated dienes, such as butadiene, isoprene and 1,4 pentadiene; and vinyl compounds, such as styrene, vinyl acetate, ethyl acrylate, methyl acrylate, methyl methacrylate, butyl acrylate, acrylonitrile, vinyl isobutyl ether, methyl styrene, hydroxy propyl methacrylate, tetrafluoroethylene, chlorotrifluoroethylene and hexafluoropropylene. Still other compounds that may be used in minor amount have the structure:

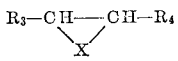

in which X is oxygen or nitrogen and $R_3$ and $R_4$ may be hydrogen, a lower branched or linear alkyl group having from 1 to 10 carbon atoms, an aryl, an aralkyl and/or an alkylaryl group. $R_3$ and $R_4$ may also be heterocyclic, alicyclic, bicyclic or polycyclic. Examples of such compounds are styrene oxide, ethylene oxide, propylene oxide, 1,2-butylene oxide, 2,3-butylene oxide, ethylene imine and propylene imine. Still other compounds that may be used in minor amount are formaldehyde, trioxane, hydroxyisobutyric acid, tetrahydrofuran, 1,3-dioxolane, 1,4-dioxane, trimethyl oxide, tetramethylene oxide and pentamethylene oxide.

We claim:
1. The method of making an episulfide polymer which comprises polymerizing one or more vicinal episulfide monomers in the presence of a catalyst which is the reaction product of two components, one of said components having the formula $R_2M$ wherein R is selected from alkyl and aryl groups and M is a metal of Group II–B of the periodic system, and the other of said components being a substance having at least one pair of unshared electrons, said substance being selected from the group consisting of elemental oxygen, elemental sulfur, carbon disulfide, carbonyl sulfide, water, hydrogen sulfide, primary and secondary amines, alkanols, ketones, mercaptans, lower fatty acids and aldehydes, said catalyst being prepered in an environment substantially free from elemental oxygen and water other than that which may be used in preparing the catalyst.

2. A method according to claim 1 and wherein the molar ratio of the first catalyst component to the second catalyst component is from 0.33:1 to 3:1.

3. A method according to claim 1 and wherein the polymerization is carried out in an inert liquid reaction medium.

4. A method according to claim 1 and wherein the polymerization is carried out in an environment substantially free from elemental oxygen and water.

5. A method according to claim 1 and wherein the catalyst is present to the extent of 0.05 to 3% by weight of the episulfide monomers.

6. A method according to claim 1 wherein said one component of said catalyst is a Group II–B metal ethyl and said other component of said catalyst is hydrogen sulfide.

7. A method according to claim 6 and wherein said Group II–B metal ethyl is diethylzinc.

8. A method according to claim 6 and wherein said Group II–B metal ethyl is diethylcadmium.

9. A method according to claim 1 and wherein said one component of said catalyst is a Group II–B metal alkyl and said other component of said catalyst is an alkanol.

10. A method according to claim 1 and wherein said one compound of said catalyst is a Group II–B metal alkyl and said other component of said catalyst is a ketone.

11. A method according to claim 1 and wherein said one component of said catalyst is a Group II–B metal alkyl and said other component of said catalyst is a mercaptan.

12. A method according to claim 1 and wherein said one component of said catalyst is a Group II–B metal alkyl and said other component of said catalyst is an amine.

13. A method according to claim 1 and wherein said one component of said catalyst is a Group II–B metal alkyl and said other component of said catalyst is a lower fatty acid.

14. A method according to claim 1 and wherein said one component of said catalyst is a Group II–B metal alkyl and said other component of said catalyst is an aldehyde.

15. A method according to claim 1 and wherein said one component of said catalyst is a Group II–B metal alkyl and said other component of said catalyst is oxygen.

16. A method according to claim 1 and wherein said one component of said catalyst is a Group II–B metal alkyl and said other component of said catalyst is carbon disulfide.

17. A method according to claim 1 and wherein said one component is cadmium diethyl and said other component is water.

18. A method of making a polysulfide polymer which comprises polymerizing one or more vicinal episulfide monomers in the presence of a catalytic amount of a catalyst which is the reaction product of diethylzinc and water prepared in an environment substantially free from oxygen and free from water other than that used in preparing the catalyst.

19. A method according to claim 18 and wherein said catalyst is the reaction product of diethylzinc and water in a molar ratio of 0.33:1 to 3:1.

20. A method according to claim 18 and wherein the polymerization is carried out in an inert liquid reaction medium.

21. A method according to claim 18 in which the vicinal episulfide is ethylene sulfide and the product is solid crystalline poly(ethylene sulfide).

22. A method according to claim 18 and wherein the vicinal episulfide is propylene sulfide and the product produced is poly(propylene sulfide).

23. A method according to claim 18 and wherein said vicinal episulfide monomers are propylene sulfide and an unsaturated aliphatic episulfide cross-linking agent and the product produced is a vulcanizable copolymer of these monomers.

24. A method according to claim 23 and wherein said cross-linking agent is allylthioglycidyl ether.

25. A method according to claim 18 and wherein said vicinal episulfide monomers are ethylene sulfide and propylene sulfide and the product produced is a copolymer of ethylene sulfide and propylene sulfide.

26. A method according to claim 18 and wherein said vicinal episulfide is butylene sulfide and the polymer product is poly(butylene sulfide).

27. A method according to claim 18 and wherein said vicinal episulfide monomers are butylene sulfide and allylthioglycidyl ether and the product produced is a curable copolymer of these monomers.

28. The method of making an episulfide polymer which comprises polymerizing one or more vicinal episulfide monomers in the presence of a catalytic amount of a catalyst which is the reaction product of a Group II–B metal ethyl and water prepared in an environment substantially free from oxygen and free from water other than that used in preparing the catalyst.

References Cited
UNITED STATES PATENTS

| | | | |
|---|---|---|---|
| 3,222,324 | 12/1965 | Brodoway | 260—79 |
| 3,222,325 | 12/1965 | Brodoway | 260—79 |
| 3,222,326 | 12/1965 | Brodoway | 260—79 |

OTHER REFERENCES

Furukawa et al.: Journal of Polymer Science, vol. 36, pages 541–3, Issue No. 130 (1959), Scientific Library QD 281 P6J6-copy in group 140.

DONALD E. CZAJA, *Primary Examiner.*

LEON J. BERCOVITZ, *Examiner.*

M. I. MARQUIS, *Assistant Examiner.*